(12) United States Patent
Sauber (10) Patent No.: US 7,042,459 B2
(45) Date of Patent: May 9, 2006

(54) SYSTEM FOR PROVIDING A VIDEO SIGNAL TO A DISPLAY DEVICE IN A SCALABLE PLATFORM

(75) Inventor: William Frederick Sauber, Georgetown, TX (US)

(73) Assignee: Dell Products L.P., Round Rock, TX (US)

( * ) Notice: Subject to any disclaimer, the term of this patent is extended or adjusted under 35 U.S.C. 154(b) by 249 days.

(21) Appl. No.: 09/768,073

(22) Filed: Jan. 23, 2001

(65) Prior Publication Data

US 2002/0097234 A1    Jul. 25, 2002

(51) Int. Cl.
  *G06F 13/14* (2006.01)
  *G06F 15/16* (2006.01)
(52) U.S. Cl. .................. 345/520; 345/519; 345/503
(58) Field of Classification Search ............... 345/520, 345/532, 132, 1.1, 3.1, 717, 778, 519, 503
See application file for complete search history.

(56) References Cited

U.S. PATENT DOCUMENTS

| 4,862,156 | A | * | 8/1989 | Westberg et al. |
| 5,072,411 | A | * | 12/1991 | Yamaki |
| 5,448,697 | A | | 9/1995 | Parks et al. |
| 5,483,260 | A | | 1/1996 | Parks et al. |
| 5,559,525 | A | * | 9/1996 | Zenda ..................... 345/3.1 |
| 6,138,193 | A | * | 10/2000 | Dalton et al. ............. 710/301 |
| 6,141,021 | A | * | 10/2000 | Bickford et al. ........... 345/503 |
| 6,304,244 | B1 | * | 10/2001 | Hawkins et al. |
| 6,326,973 | B1 | * | 12/2001 | Behrbaum et al. |
| 6,804,724 | B1 | * | 10/2004 | Shin ............................ 710/2 |

\* cited by examiner

*Primary Examiner*—Matthew C. Bella
*Assistant Examiner*—Hau Nguyen
(74) *Attorney, Agent, or Firm*—Haynes and Boone, LLP (57) ABSTRACT

A computer system that includes a first video controller, a second video controller, and a switching device is provided. The switching device is configured to receive a first signal from the first video controller and a second signal from the second video controller. The switching device is configured to provide the first signal or the second signal to a first display device.

7 Claims, 7 Drawing Sheets

SYSTEM FOR PROVIDING A VIDEO SIGNAL TO A DISPLAY DEVICE IN A SCALABLE PLATFORM

BACKGROUND

The disclosures herein relate generally to computer systems and more particularly to a system for providing a video signal to a display device in a scalable platform.

Computer systems with scalable video solutions are becoming more popular. These platforms offer the choice between a low cost, low performance video controller integrated in the chipset on the motherboard or the addition of a higher cost, higher performance video controller, such as a video controller on card that couples to an AGP (Accelerated Graphics Port) slot, plugged into the system. The integrated video controller uses a display connector on the motherboard, and the additional video controller uses a display connector on its card. Where the platform includes the additional video controller, a user may not know which connector to use to plug in a display device.

Figure 1:
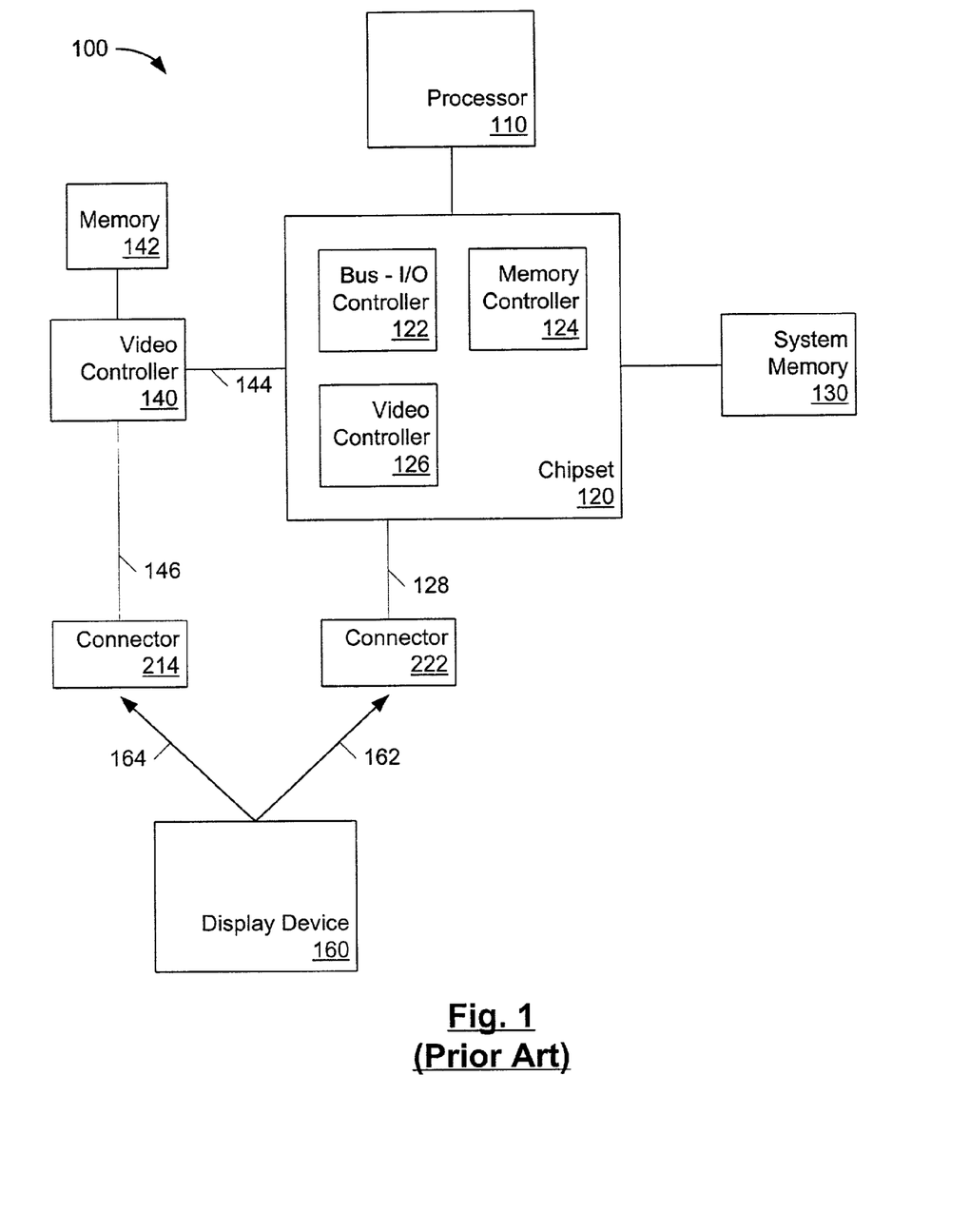
FIG. 1 is a diagram illustrating a prior art embodiment of a computer system.

FIG. 1 is a prior art embodiment of a computer system 100 that illustrates this scenario. In FIG. 1, a processor 110 is coupled to a chipset 120 that includes a bus-input/output (I/O) controller 122, a memory controller 124, and an integrated video controller 126. A system memory 130 is coupled to chipset 120. An optional video controller 140 and a memory 142 are also included in computer system 100. Video controller 140 is coupled to chipset 120 using a port 144 such as an AGP port.

In FIG. 1, video controller 126 provides its output signals to a display device that couples to a connector 222. Likewise, video controller 140 provides its output signals to a display device that couples to a connector 214. As indicated by arrows 162 and 164, a display device 160 may be coupled to either connector 222 or connector 214 to receive output signals from either video controller 126 or video controller 140, respectively.

Figure 2:
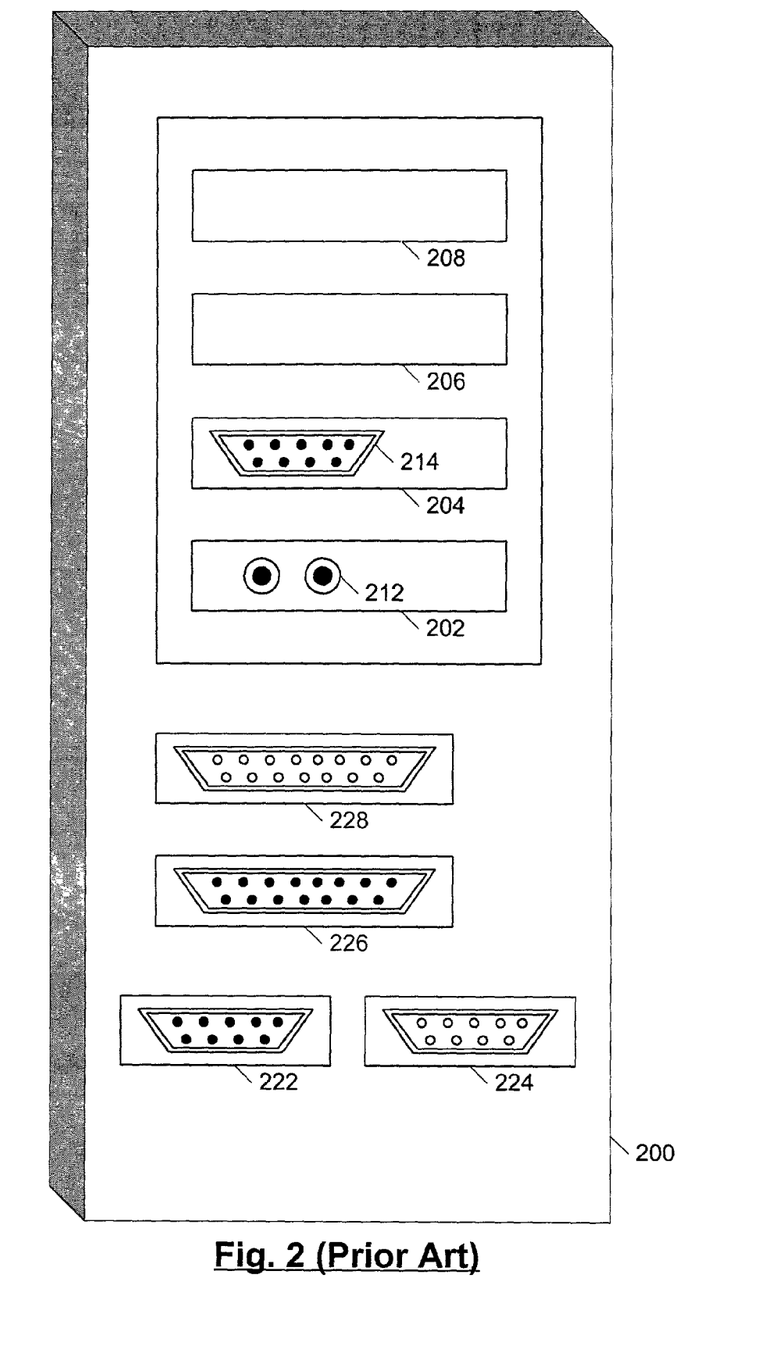
FIG. 2 is a diagram illustrating a prior art embodiment of a chassis of a computer system.

FIG. 2 is a diagram illustrating a prior art embodiment of a chassis 200 of the computer system 100. In FIG. 2, chassis 200 includes various connectors 212, 214, 222, 224, 226, and 228 that may be used to connect various devices to computer system 100. Chassis 200 also includes card slots 202, 204, 206, and 208 to provide access to connectors on cards such as connectors 212 and 214. As shown in FIG. 2, connectors 222 and 214 are identical such that each is capable of connecting to display device 160. As shown in FIG. 1, connectors 222 and 214 are coupled to video controllers 126 and 140, respectively. A user may not know whether to connect display device 160 to connector 222 or connector 214. It may be possible to detect to which connector the display is attached and operate through that video controller, but the user might not be attached to the higher performance controller and not receive the improvements that were purchased.

It would be desirable to for a user to know which connector to use to plug in a display device. Therefore, what is needed is a system for providing a video signal to a display device in a scalable platform.

SUMMARY

One embodiment, accordingly, provides a computer system that includes a first video controller, a second video controller, and a switching device. The switching device is configured to receive a first signal from the first video controller and a second signal from the second video controller. The switching device is configured to provide the first signal or the second signal to a first display device.

A principal advantage of this embodiment is that it allows a user to properly connect a display device to a scalable platform. The system provides the user with one suitable place to connect the display device to prevent the user from plugging the display device into the wrong connector. Accordingly, the user enjoys the benefits of a scalable platform without any confusion as to where to connect the display device.

DETAILED DESCRIPTION

Figure 3:
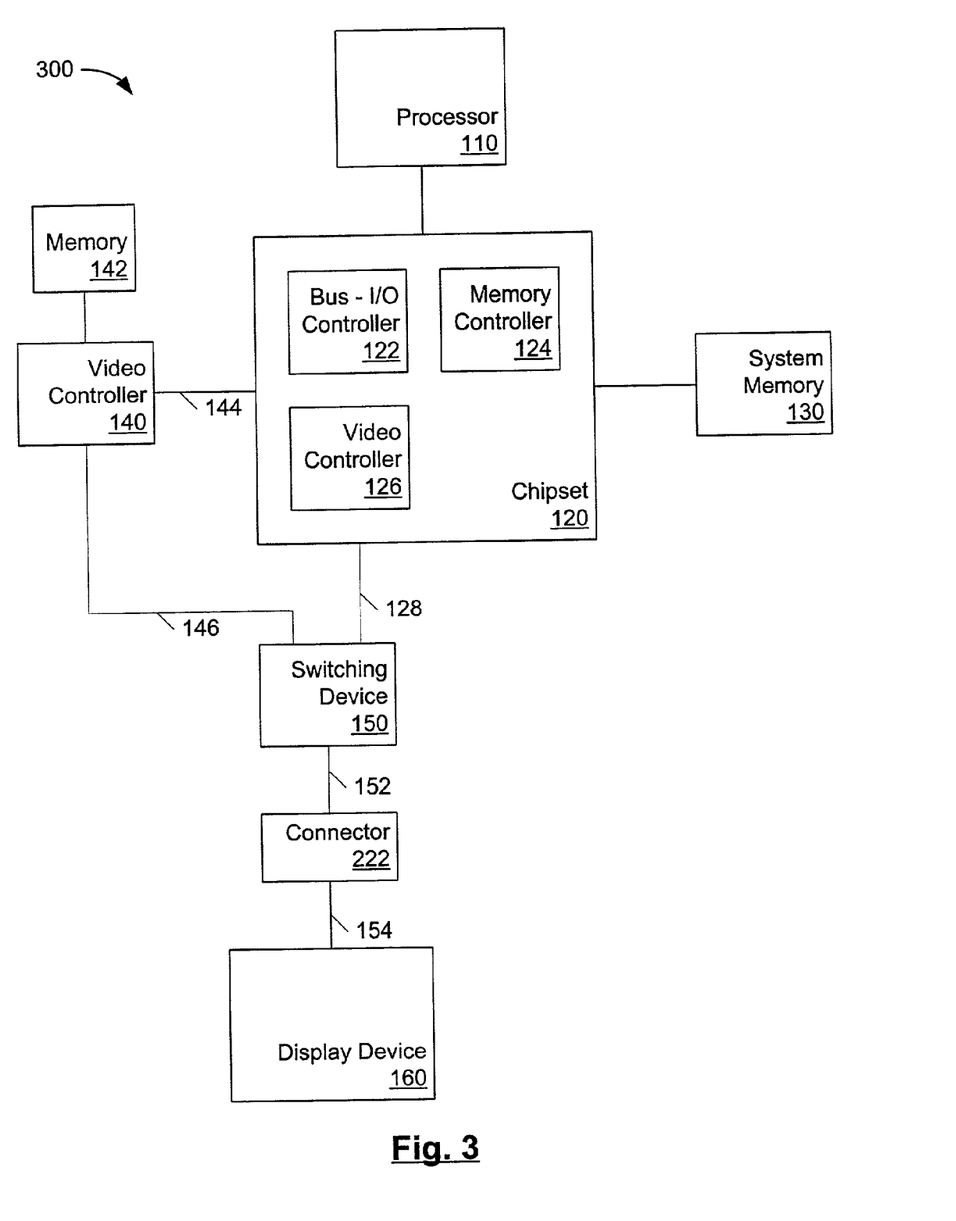
FIG. 3 is a diagram illustrating a first embodiment of selected components of a computer system.

FIG. 3 is an embodiment of selected components of a computer system 300. In FIG. 3, a processor 110 is coupled to a chipset 120 that includes a bus-(I/O) controller 122, a memory controller 124, and an integrated video controller 126. A system memory 130 is coupled to chipset 120. Optional video controller 140 and memory 142 are also included in computer system 300. Video controller 140 is coupled to chipset 120 using a port 144 such as an AGP port. Video controller 126 and video controller 140 are coupled to a switching device 150 as indicated by connections 128 and 146, respectively. Switching device 150 is coupled to connector 222 as indicated by a connection 152, and a display device 160 is coupled to connector 222 as indicated by a connection 154.

In FIG. 3, video controller 126 and video controller 140 provide video signals to switching device 150. Switching device 150 provides the video signals from either video controller 126 or video controller 140 to display device 160 via connector 222. Switching device 150 may be any suitable device, such as an analog multiplexor or a low resistance switch, configured to selectively provide video signals from either video controller 126 or video controller 140 to display device 160.

In response to video controller 140 being present in computer system 300, switching device 150 is set to provide video signals from video controller 140 to display device 160. Video controller 140 may be a higher cost, higher performance video controller than video controller 126. Computer system 300 includes an interface to allow video controller 140 to be installed. The interface includes a connection to chipset 120 and a connection to switching device 150. As described in more detail below, a determination is made as to whether video controller 140 is coupled to the interface, i.e. whether video controller 140 is present in computer system 300. The determination may be made automatically or manually. If video controller 140 is present, then switching device 150 provides the video signals from video controller 140, rather than the video signals from video controller 126, to display device 160.

In response to video controller 140 not being present in computer system 300, switching device 150 is set to provide video signals from video controller 126 to display device 160. In FIG. 3, video controller 126 is integrated into chipset 120 and may be a lower cost, lower performance video controller than video controller 140. If video controller 140 is not present, then the video signals of video controller 126 are provided by switching device 150 to display device 160.

Video controller 140 may be coupled to computer system 300 in various ways. In one embodiment, video controller 140 is installed in a slot on a motherboard of computer system 300 to couple it to chipset 120. An additional connection from video controller 140 to the motherboard is used to couple it to switching device 150. In other embodiments, video controller 140 is coupled to chipset 120 and switching device 150 in other ways including through a single connector.

In one embodiment, a program executable by processor 110 controls the operation of switching device 150, i.e. the program causes processor 110 to select the video signals to provide to display device 160. In this embodiment, the program includes instructions to cause processor 110 to determine whether video controller 140 is present in computer system 300, e.g. by determining whether a response is received from video controller 140 when its interface is queried. If video controller 140 is present, then instructions in the program cause switching device 150 to provide video signals from video controller 140 to display device 160. If video controller 140 is not present, then instructions in the program cause switching device 150 to provide video signals from video controller 126 to display device 160. The program may also include instructions that cause other functions associated with video controller 126, video controller 140, and switching device 150 to be performed. For example, instructions in the program may cause video controller 126 to be powered down in response to detecting the presence of video controller 140. In computer system 300, the program may be a separate entity or may be included as part of a basic input output system (BIOS), firmware, or an operating system and drivers associated with video controllers 126 and 140. The program may also cause inputs to be received from a user and set switching device 150 based on these inputs.

In another embodiment, switching device 150 is set manually using a switch control, a jumper, or other manually set device or devices. In this embodiment, a manufacturer of computer system 300 or a user may set switch device 150 to cause the desired operation. In other embodiments, the operation of switching device 150 may be controlled by a combination of a program and one or more manually set devices or in other suitable ways.

In the embodiment of FIG. 3, bus-I/O controller 122, memory controller 124, and video controller 126 are included in chipset 120. In other embodiments, the functions of one or more of these components 122, 124, and 126 may be included in other components of computer system 300 such as processor 110. Alternatively, one or more of these components 122, 124, and 126 may be included in or combined into a separate component.

Figure 4:
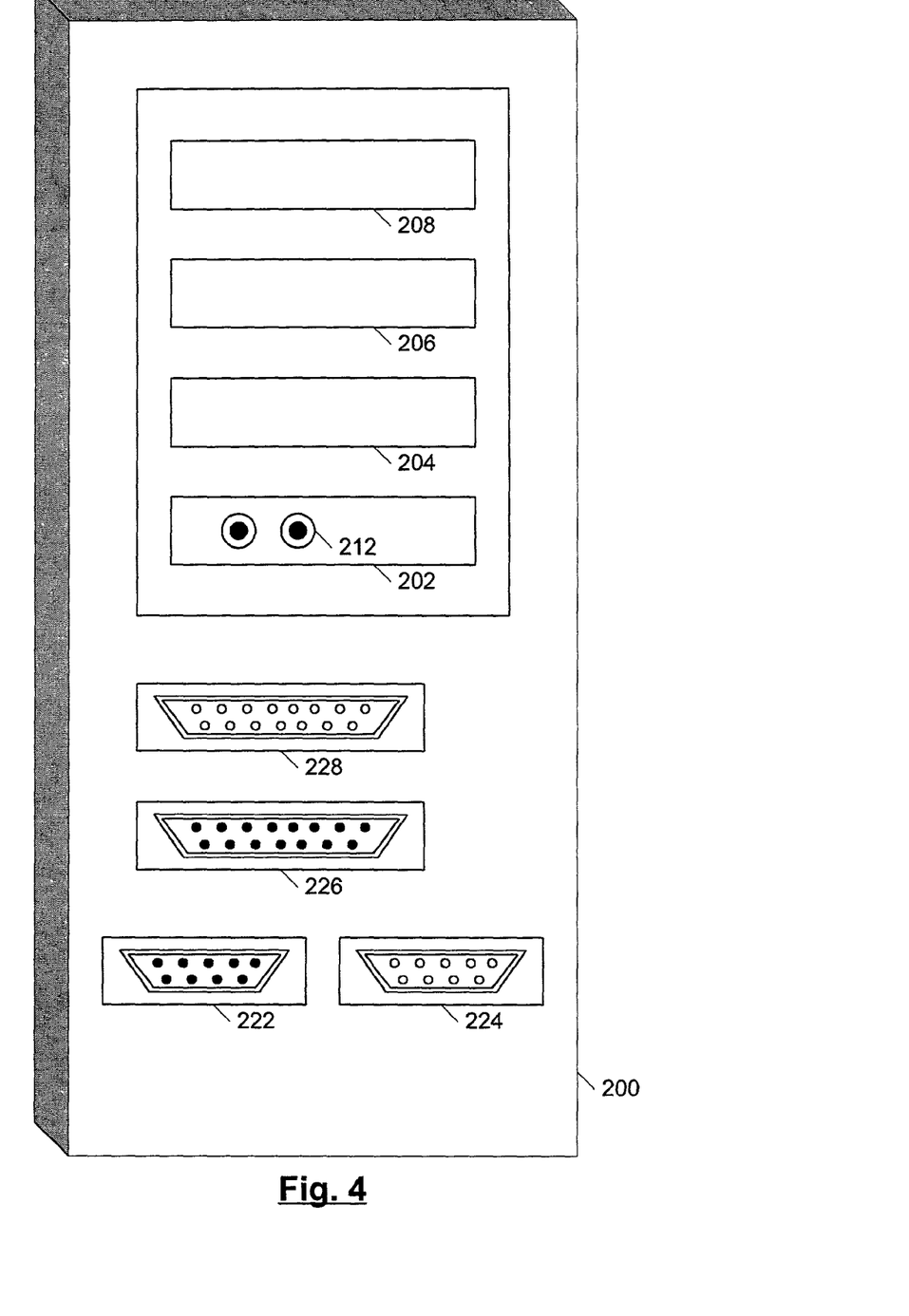
FIG. 4 is a diagram illustrating an embodiment of a chassis of a computer system.

The perspective of a user of computer system 300 may be seen in FIG. 4. FIG. 4 is a diagram illustrating an embodiment of a chassis 200 of computer system 300. In FIG. 4, chassis 200 includes various connectors 212, 222, 224, 226, and 228 that may be used to connect various devices to computer system 300. Chassis 200 also includes card slots 202, 204, 206, and 208 to provide access to connectors on cards such as connectors 212. The user of computer system 300 needs to determine where to plug in a display device to chassis 200.

As described above in the discussion of FIG. 3, display device 160 couples to computer system 300 using connector 222. As shown in FIG. 4, connector 222 differs from the other connectors 212, 224, 226, and 228. Accordingly, connector 222 provides the only suitable connection for a user to connect display device 160 to computer system 300. In this way, the user is virtually assured of connecting display device 160 to the desired video controller.

Figure 5:
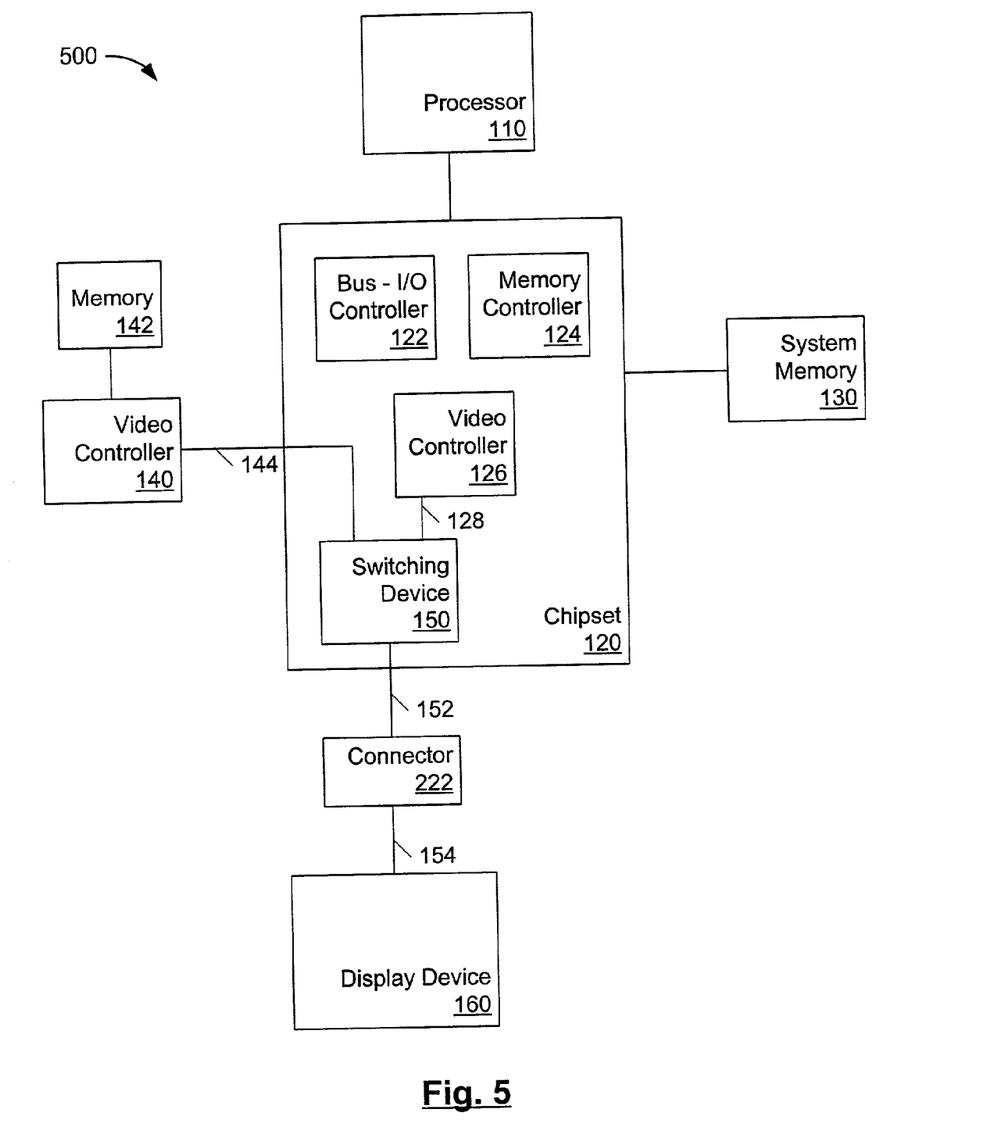
FIG. 5 is a diagram illustrating a second embodiment of selected components of a computer system.

FIG. 5 is an embodiment of selected components of a computer system 500. In FIG. 5, a processor 110 is coupled to a chipset 120 that includes a bus-(I/O) controller 122, a memory controller 124, an integrated video controller 126, and a switching device 150. A system memory 130 is coupled to chipset 120. Optional video controller 140 and memory 142 are also included in computer system 500. Video controller 140 is coupled to chipset 120 using a port 144 such as an AGP port. Video controller 126 and video controller 140 are coupled to a switching device 150 as indicated by connections 128 and 144, respectively. Switching device 150 is coupled to a connector 222 as indicated by a connection 152, and a display device 160 is coupled to connector 222 as indicated by a connection 154.

The embodiment shown in FIG. 5 operates similarly to the embodiment shown in FIG. 3. In FIG. 5, video controller 126 and video controller 140 provide video signals to switching device 150. Switching device 150 provides the video signals from either video controller 126 or video controller 140 to display device 160 via connector 222. Switching device 150 may be any suitable device, such as an analog multiplexor or a low resistance switch, configured to selectively provide video signals from either video controller 126 or video controller 140 to display device 160.

In FIG. 5, however, switching device 150 is included in chipset 120 and video controller 140 provides its video signals to switching device 150 through chipset 120. In one particular embodiment, video controller 140 provides its video signals to chipset 120 using an AGP port with one or more additional signals added from video controller 140 to the AGP port. Switching device 150 then provides the appropriate video signals to display device 160. Switching device 150 may be set automatically or manually as described above. The embodiment shown in FIG. 5 may be housed in chassis 200 shown in FIG. 4.

Figure 6:
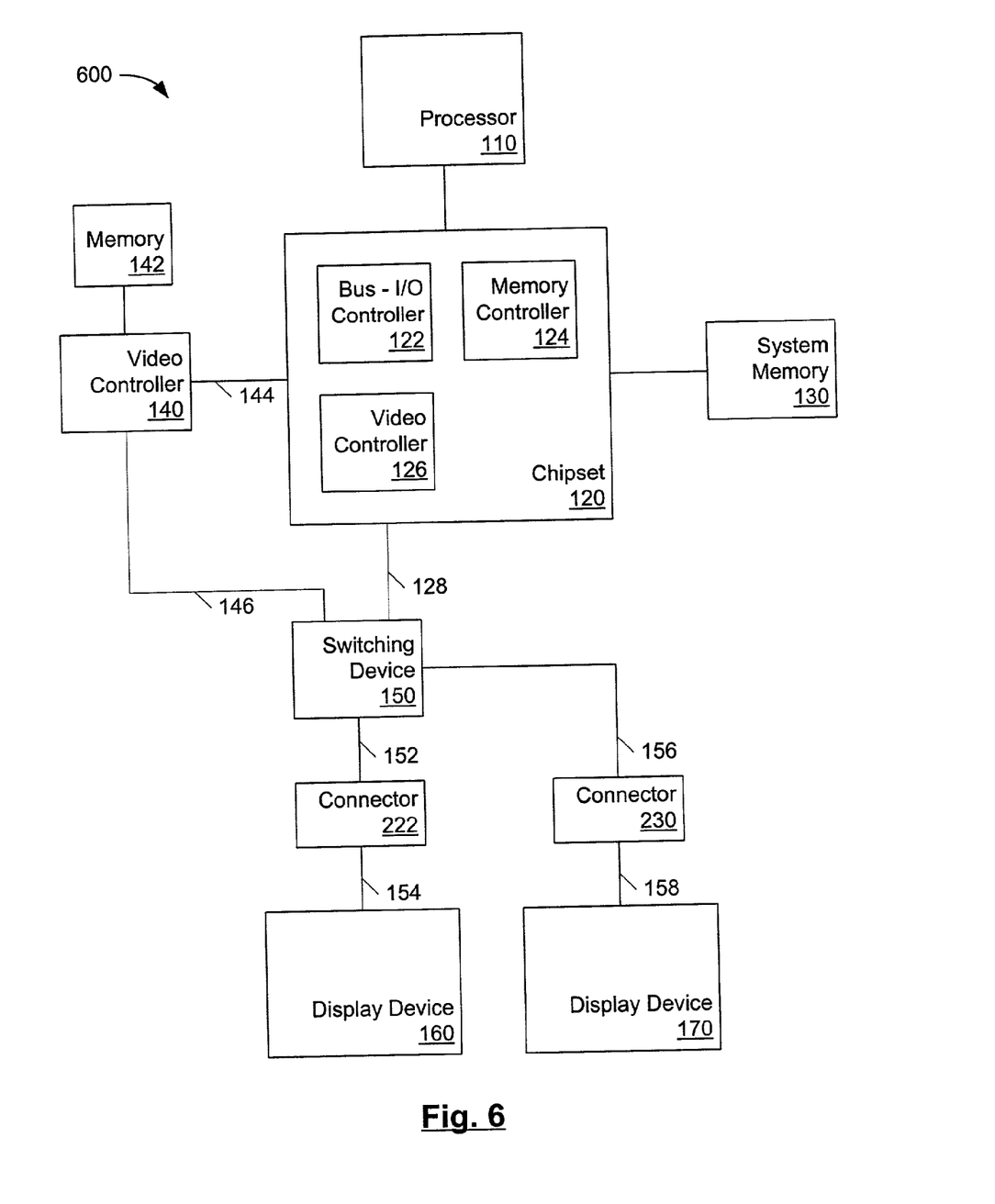
FIG. 6 is a diagram illustrating a third embodiment of selected components of a computer system.

FIG. 6 is an embodiment of selected components of a computer system 600. In FIG. 6, a processor 110 is coupled to a chipset 120 that includes a bus-(I/O) controller 122, a memory controller 124, and an integrated video controller 126. A system memory 130 is coupled to chipset 120. Optional video controller 140 and memory 142 are also included in computer system 300. Video controller 140 is coupled to chipset 120 using a port 144 such as an AGP port. Video controller 126 and video controller 140 are coupled to a switching device 150 as indicated by connections 128 and 146, respectively. Switching device 150 is coupled to a connector 222 as indicated by a connection 152, and a display device 160 is coupled to connector 222 as indicated by a connection 154. Switching device 150 is also coupled to a connector 230 as indicated by a connection 156, and a display device 170 is coupled to connector 230 as indicated by a connection 158.

The embodiment shown in FIG. 6 operates similarly to the embodiment shown in FIG. 3. In FIG. 6, video controller 126 and video controller 140 provide video signals to switching device 150. Switching device 150 provides the video signals from either video controller 126 or video controller 140 to display device 160 via connector 222. Switching device 150 may be any suitable device, such as an analog multiplexor or a low resistance switch, configured to selectively provide video signals from either video controller 126 or video controller 140 to display device 160.

The embodiment shown in FIG. 6, however, illustrates an additional feature, i.e. the ability to add a second display device, display device 170, to the embodiment shown in FIG. 3. In FIG. 6, switching device 150 is set to provide video signals from video controller 126 or video controller 140 to both display devices 160 and 170. Switching device 150 may be set automatically or manually as described above.

In one embodiment, display device 160 is an analog display device, e.g. a VGA device, and display device 170 is a digital display device, e.g. a DVI device. Accordingly, switching device 150 may be configured to receive both analog and digital video signals from video controllers 126 and 140. That is, video controllers 126 and 140 may have both analog and digital outputs.

Note that the digital outputs of video controllers may require additional circuitry to translate the signals from standard logic levels to other standard formats such as TMDS (Transition Minimized Differential Signaling) or LVDS (Low Voltage Differential Signaling). This translation could occur at the input or the output of switching device 150.

Figure 7:
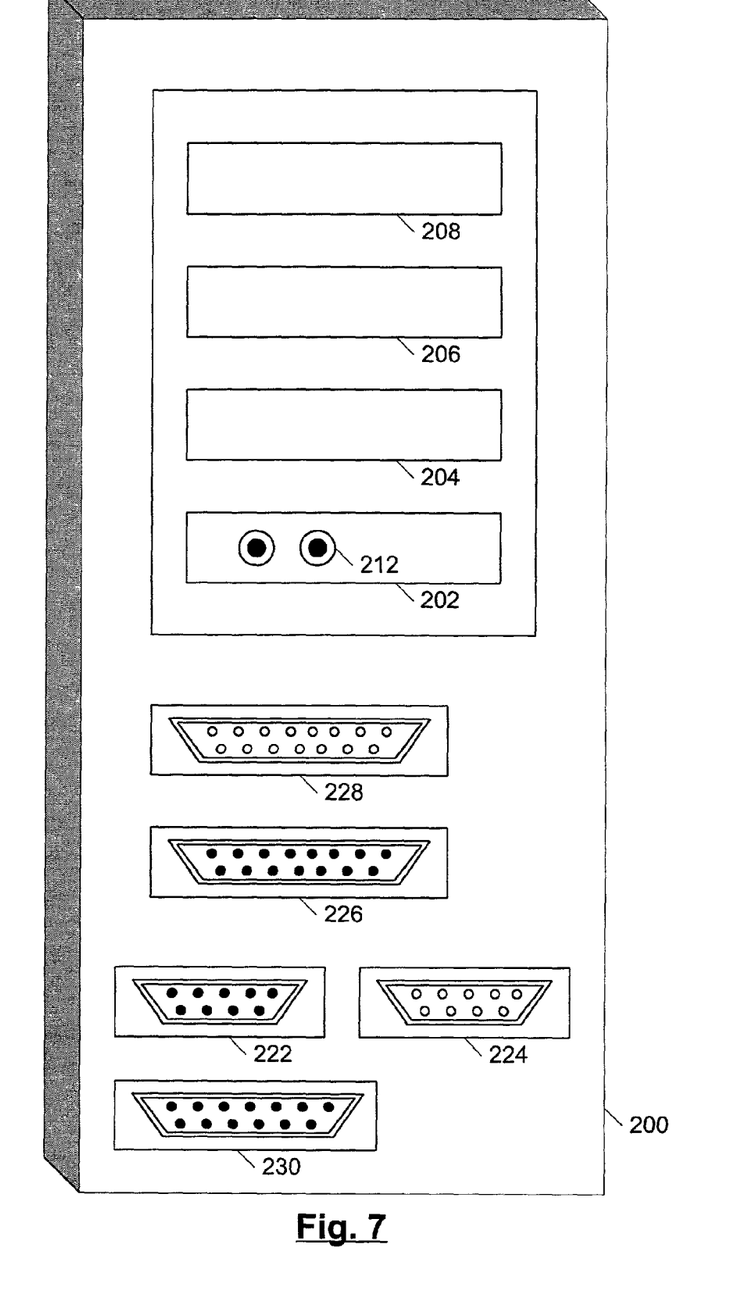
FIG. 7 is a diagram illustrating an embodiment of a chassis of a computer system.

The embodiment shown in FIG. 6 may be housed in chassis 200 shown in FIG. 7, which is a diagram illustrating an embodiment of a chassis 200 of a computer system 600. In FIG. 7, chassis 200 includes various connectors 212, 222, 224, 226, 228, and 230 that may be used to connect various devices to computer system 600. Chassis 200 also includes card slots 202, 204, 206, and 208 to provide access to connectors on cards such as connectors 212.

As described above in the discussion of FIG. 6, display device 160 couples to computer system 600 using connector 222, and display device 170 couples to computer system 600 using connector 230. A user may connect two display devices 160 and 170 to computer system 600 using connectors 222 and 230. In this way, the user is able to utilize analog and/or digital displays in computer system 600.

In one embodiment, connector 222 is configured to connect to an analog display device and connector 230 is configured to connect to a digital display device. In other embodiments, connectors 222 and 230 may be configured to connect to other display types.

As can be seen, the principal advantages of these embodiments are that they allow a user to properly connect a display device to a scalable platform. The system provides the user with one suitable place to connect the display device to prevent the user from plugging the display device into the wrong connector. Accordingly, the user enjoys the benefits of a scalable platform without any confusion as to where to connect the display device. The system may allow a computer system manufacturer to more easily offer a diverse set of features and options on its computer systems while minimizing confusion on the part of the user.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A computer system comprising:
   a chipset including a bus-IO controller, a memory controller and a first video controller integrated into the chipset;
   a second video controller coupled to the chipset;
   a display device coupled to the video controllers;
   a low-resistance switching device included in the chipset configured to receive video signals from either of the video controllers at respective inputs and to selectively provide the signals to a compatible display device; and
   the switching device being coupled to a connector for the display device;
   whereby only the second video controller provides its video signals to the switching device through the chipset via an AGP port.

2. The computer system of claim 1, further comprising:
   a processor coupled to the chipset; and
   a system memory configured to store a program that is executable by the processor;
   wherein the program includes instructions for causing the switching device to selectively provide the signals to the display device.

3. The computer system of claim 1, wherein the signals include analog and digital signals.

4. A computer system comprising:
   a chipset including a bus-I/O controller, a memory controller and a first video controller integrated into the chipset;
   an interface coupled to the chipset and configured to receive a second video controller coupled to the chipset;
   a display device coupled to the video controllers;
   a low-resistance switching device included in the chipset coupled to receive video signals from either of the video controllers at respective inputs and to selectively provide the signals to a compatible device; and
   the switching device being coupled to a connector for the display device;
   whereby only the second video controller provides its video signals to the switching device through the chipset via an AGP port.

5. The computer system of claim 4, further comprising:
   a processor coupled to the chipset; and
   a system memory configured to store a program that is executable by the processor;
   wherein the program includes instructions for causing the switching device to selectively provide a signal from the first video controller to the display device in response to the second video controller not being coupled to the interface, and wherein the program includes instructions for causing the switching device to selectively provide a signal from the second video controller to the display device in response to the second video controller being coupled to the interface.

6. The computer system of claim 4, wherein the signals include analog and digital signals.

7. A method of providing a video signal to a display device in a scalable platform comprising:
   providing a chipset including a bus-I/O controller, a memory controller and a first video controller integrated into the chipset;

providing a second video controller coupled to the chipset;

providing a display device coupled to the video controllers;

configuring a low-resistance switching device included in the chipset to receive video signals at respective inputs from either of the video controllers and to selectively provide the signals to a compatible display device; and only the second video controller providing its video signals to the switching device trough the chipset via an AGP port.

* * * * *

UNITED STATES PATENT AND TRADEMARK OFFICE
CERTIFICATE OF CORRECTION

PATENT NO. : 7,042,459 B2
APPLICATION NO. : 09/768073
DATED : May 9, 2006
INVENTOR(S) : William Frederick Sauber It is certified that error appears in the above-identified patent and that said Letters Patent is hereby corrected as shown below:

Claim 7, Column 8, Line 4, delete "trough" and insert --through--.

Signed and Sealed this

Thirty-first Day of July, 2007

JON W. DUDAS
*Director of the United States Patent and Trademark Office*